Jan. 5, 1943.         D. R. MATTOON              2,307,145
                      HANDLE ASSEMBLY
                     Filed May 28, 1941
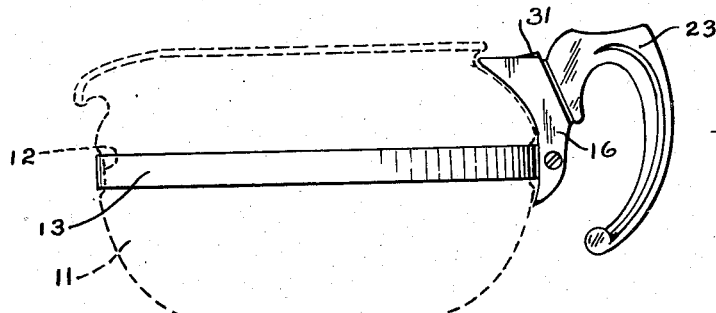
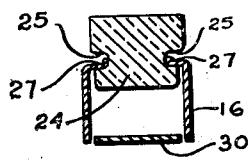
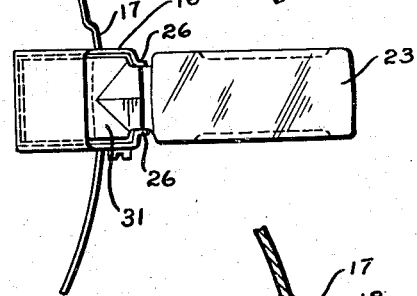
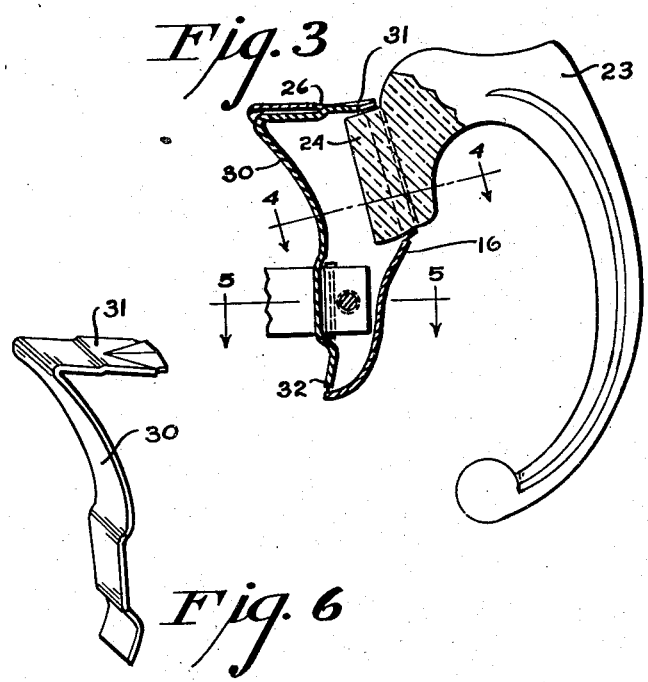
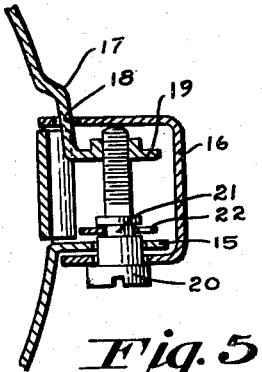
Inventor
DEO R. MATTOON
Attorney Patented Jan. 5, 1943

2,307,145

UNITED STATES PATENT OFFICE 2,307,145

HANDLE ASSEMBLY

Deo R. Mattoon, Corning, N. Y., assignor to Corning Glass Works, Corning, N. Y., a corporation of New York Application May 28, 1941, Serial No. 395,685

8 Claims. (Cl. 16—114)

The present invention relates to handle assemblies for cooking vessels and more particularly to a handle assembly suitable for attachment to non-metallic vessels as glass, eartherware and the like.

One object of the invention is an improved handle assembly which can be attached to or removed from a vessel without removal of any part of the assembly from association with the remaining parts thereof.

Another object is a combination of parts so designed that it is practicable to employ a handle proper made of glass or similar material.

A further object is a handle assembly which is firmly held with respect to a vessel with which it cooperates.

A handle assembly fulfilling the foregoing objects is shown in the accompanying drawing in which:

Fig. 1 is an elevation of the handle assembly attached to a vessel;

Fig. 2 is a plan view, on an enlarged scale, of the handle assembly but with the major portion of the vessel encircling band thereof broken away;

Fig. 3 is a side elevation partly in section of the part of the assembly shown in Fig. 2;

Fig. 4 is a sectional view taken on line 4—4 of Fig. 3;

Fig. 5 is a sectional view taken on line 5—5 of Fig. 3; and

Fig. 6 is a perspective view of a locking clip of the assembly.

In the structure illustrated the vessel 11 has a shallow groove 12 in its surrounding outer surface. A metal strap or band 13 is arranged in this groove and encircles the vessel. One end of the strap 13 terminates in an apertured lug 15 which enters a sheet metal enclosure 16 through an opening therein facing the vessel 11. The other end of strap 13 is slightly offset at 17, projects through a slotted aperture 18 in the side of enclosure 16, and is formed into a lug 19 arranged parallel to lug 15 and having a threaded aperture therethrough in alignment with the aperture in lug 15. A clamping screw 20 projects through an aperture in housing 16, through the aperture in lug 15 and is threaded into the aperture in lug 19. A groove 21 in an enlarged unthreaded portion of screw 20 has a lock washer 22 pressed therein to prevent subsequent removal of the screw from the assembly. The end of the handle 23 by which it is anchored to the enclosure 16 comprises a relatively heavy portion 24 having oppositely disposed grooves 25. The handle portion 24 is introduced into enclosure 16 via the top portion of an opening 26 with the flared side portions 27 of enclosure 16 entering and tightly hugging the bottoms of the grooves 25. The handle 23 when thus associated with the enclosure 16 is prevented from being withdrawn therefrom by a clip 30 shaped to close the opening in enclosure 16 adjacent the vessel and having a portion 31 adapted to close the portion of the opening 26 via which the handle portion 24 entered the enclosure. The major portion of clip 30 is held snugly between the enclosure 16 and the vessel 11 and accordingly displacement of the clip is positively prevented when the handle assembly is in place and the clamping screw 20 has been turned to tightly draw the strap 13 about the vessel. Attention, however, is directed to the fact that the height of clip 30 is such relative to the height of the opening in enclosure 16 adjacent the vessel 11 that the clip must be sprung or brought under tension to bring its lower end 32 within the enclosure so that the clip functions to firmly hold the handle 23 in the enclosure even when the screw 20 is turned to loosen band 12 as required to free the assembly as a whole from the vessel.

What is claimed is:

1. In a handle assembly a housing having one side open the full length of the housing with a limited portion of the opposite side and adjoining top portion open, a handle having a portion introduced into the housing via the top portion of the latter opening and having grooves into which the part of the housing bordering the latter side opening advances as the specified handle portion is advanced into said housing, and a closure member for said housing extending from the bottom of the full length opening thereof to the bottom surface of the top thereof and thence projecting over the last portion of the handle to enter the enclosure.

2. In a handle structure a sheet metal enclosure having associated means for rigidly clamping it to an article of ware, a grooved handle for attachment to said enclosure having a part introduced into the enclosure through an enlarged opening therein having a connected restricted opening through which the handle projects, and a member arranged within said enclosure closing the enlarged portion of its opening and bearing against the handle to prevent relative movement between it and said enclosure.

3. In a handle assembly for an article of ware, a metal housing having an open side for arrangement adjacent the ware and having an oppositely disposed opening through which a handle is projected from within the housing, there being an enlarged portion of the latter opening affording such relationship of the handle with said enclosure, and means cooperative with said enclosure to close its open side as well as the portion of the opening through which the handle is projected into the enclosure.

4. In combination with an article of ware, a handle assembly including a sheet metal enclosure having an open side adjacent the ware and the walls bounding such open side following the general contour of the adjacent ware surface, a strap encircling the ware and having its ends arranged within the enclosure, clamping means cooperative with the ends of said strap and said enclosure to clamp the enclosure tightly against the article, a handle arranged in a predetermined position with respect to and partly within said enclosure, and a unitary means operative to close said opening and prevent movement of said handle relative to said enclosure.

5. In a handle assembly an enclosure having associated means for clamping it to an article of ware and having an open side through which free access may be had to its interior, said enclosure also having portions coextensive with a second opening for receipt of a handle unit, a handle unit having grooves which register with said portions of the enclosure when the handle portion adjacent its grooves is introduced into the enclosure via the second opening, and a unitary member closing the respective openings of said enclosure.

6. In a handle assembly a hollow ferrule of generally U-shaped cross section, a slot formed in the back of said ferrule and terminating in an opening of greater width than said slot, a handle having grooves in its opposite faces adapted to be inserted through the opening in said ferrule so that the edges of said slot occupy said grooves, and a clip member filling the open side of the ferrule and having a laterally offset portion extending through the hollow body of said ferrule and across the opening therein thereby locking said handle against withdrawal from said slot.

7. In a handle assembly a hollow ferrule of generally U-shaped cross section, a slot formed in the back of said ferrule and terminating in an opening of greater width than said slot, a handle having grooves in its opposite faces adapted to be inserted through the opening in said ferrule so that the edges of said slot occupy said grooves, and a clip member filling the open side of the ferrule and having a laterally offset portion, said portion extending through the hollow body of said ferrule and across the opening therein thereby locking said handle against withdrawal from said slot, and means for attaching said ferrule to a vessel with its open side in contact therewith so that said clip member is locked therein.

8. In a handle assembly a housing having one side open the full length of the housing with a limited portion of the opposite side and an adjoining end portion open, a handle having a portion introduced into the housing via the end portion of the latter opening and having grooves into which the part of the housing bordering the latter side opening advance as the specified handle portion is advanced into said housing, and a closure member for said housing extending from the one end of the full length opening thereof to the inner surface to the other end thereof and thence projecting over the last portion of the handle to enter the closure.

DEO R. MATTOON.